United States Patent [19]

Chan

[11] Patent Number: 4,818,188

[45] Date of Patent: Apr. 4, 1989

[54] WATER AND AIR PUMPING APPARATUS FOR A FISH-RAISING POOL

[76] Inventor: Kuan-Der Chan, No. 13, Lien Shih, Lien Shih Li, Hu Wei Chen, Yun Lin Hsien, Taiwan

[21] Appl. No.: 135,736

[22] Filed: Dec. 21, 1987

[51] Int. Cl.[4] .................. F04B 23/10; F04B 43/02
[52] U.S. Cl. ................................. 417/201; 417/413
[58] Field of Search ............... 417/412, 413, 423 G, 417/201, 202; 310/21, 29, 32, 33, 36, 172, 254; 119/3

[56] References Cited

U.S. PATENT DOCUMENTS

| | | | |
|---|---|---|---|
| 2,730,095 | 1/1956 | Scott | 417/201 X |
| 2,845,875 | 8/1958 | Corbett | 417/201 X |
| 3,024,377 | 3/1962 | Tupper | 310/172 |
| 3,493,793 | 2/1970 | Niemela | 310/29 |
| 3,825,374 | 7/1974 | Kondo | 417/413 |
| 3,830,596 | 8/1974 | Kondo | 417/413 |
| 4,160,177 | 7/1979 | Ascoli | 310/29 X |
| 4,162,876 | 7/1979 | Kolfertz | 417/413 |
| 4,506,182 | 3/1985 | Rohdin | 310/254 X |

Primary Examiner—Carlton R. Croyle
Assistant Examiner—Eugene L. Szczecina, Jr.
Attorney, Agent, or Firm—Browdy and Neimark

[57] ABSTRACT

A water and air pumping apparatus for a fish-raising pool includes a shaded-pole motor, a centrifugal water-pumping mechanism and an air-pumping drum device, and is characterized in that on the suitable side surface of the laminated core of the motor, there are provided with two longitudinal grooves, and the apparatus further includes a magnet connected to the air-pumping drum device and so disposed as to face the grooves and to be capable of transversely reciprocating so that a strong variant magnetic field resulted by the provision of grooves will reciprocate the magnet and thus the air-pumping drum device is activated, when the motor drives the water-pumping mechanism.

2 Claims, 3 Drawing Sheets

WATER AND AIR PUMPING APPARATUS FOR A FISH-RAISING POOL

BACKGROUND OF THE INVENTION

The present invention relates to a pumping apparatus, and more particularly to a pumping apparatus for a fish-raising pool.

So far as a fish-raising pool is concerned, the circulating pool water and the oxygen dissolved in the pool water are closely related to the existence of fishes therein since they are crowdedly raised in the pool and thus the living space for every fish is relatively reduced.

To improve the circulation of and increase the dissolved oxygen in the pool water, the prior art uses a vehicle for splashing on the water surface. In order to achieve a satisfactory result, a fish-raising pool usually is equipped with several such vehicles, which, nevertheless, is power-consuming and not cost-effective. In an effort to overcome this shortcoming, someone tried to pump the bottom water in the pool upwards so that good circulation of the pool water is obtained. The problem of enough dissolved oxygen in the pool water, however, is not solved by this trial which, in fact, calls for an independent air-pumping device, and thus, it is not really cost-effective but still is power-consuming and space-occupying.

It is therefore attemped by the Applicant to overcome the above shortcomings encountered by the prior art to the largest extent possible.

SUMMARY OF THE INVENTION

It is therefore an object of the present invention to provide a water and air pumping apparatus for a fish-raising pool merely driven by a single motor.

According to the present invention, a water and air pumping apparatus for a fish-raising pool includes a shaded-pole motor, a centrifugal water-pumping mechanism, an air-pumping drum device and a magnet connected to the air-pumping drum device, wherein on the suitable side surface of the laminated core of the motor, two longitudinal grooves are provided towards which the magnet faces which is capable of transversely reciprocating so that a strong variant magnetic field resulted by the provision of grooves will reciprocate the magnet and thus the air-pumping drum device is activated, when the motor drives the water-pumping mechanism.

BRIEF DESCRIPTION OF THE DRAWING

The present invention may best be understood through the following description with reference to the accompanying drawings, in which.

DETAILED DESCRIPTION OF THE PREFERRED EMBODIMENT

Figure 1:
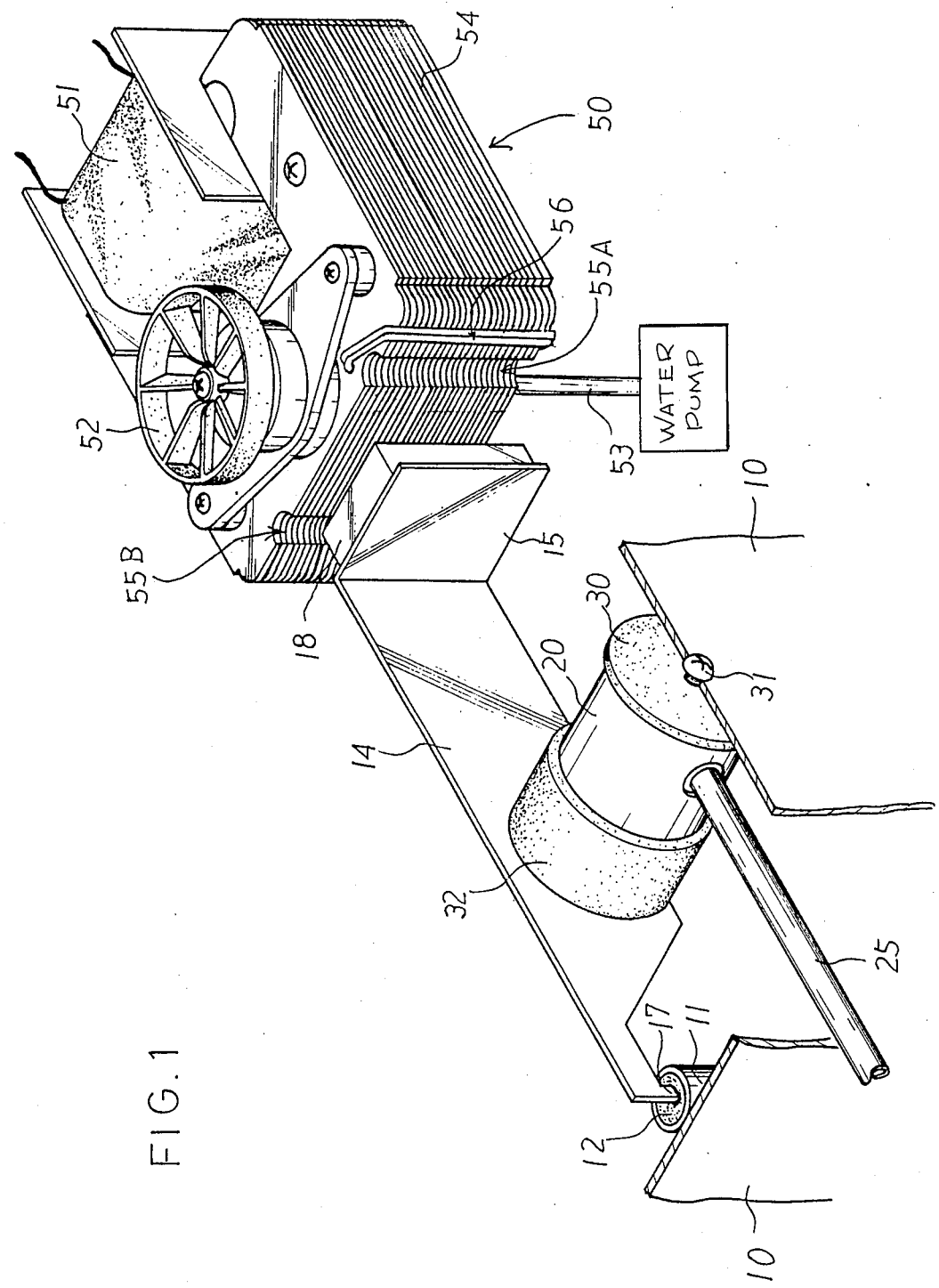
FIG. 1 is a perspective view showing a preferred embodiment of a water and air-pumping apparatus for a fish-raising pool according to the present invention.
Figure 2:
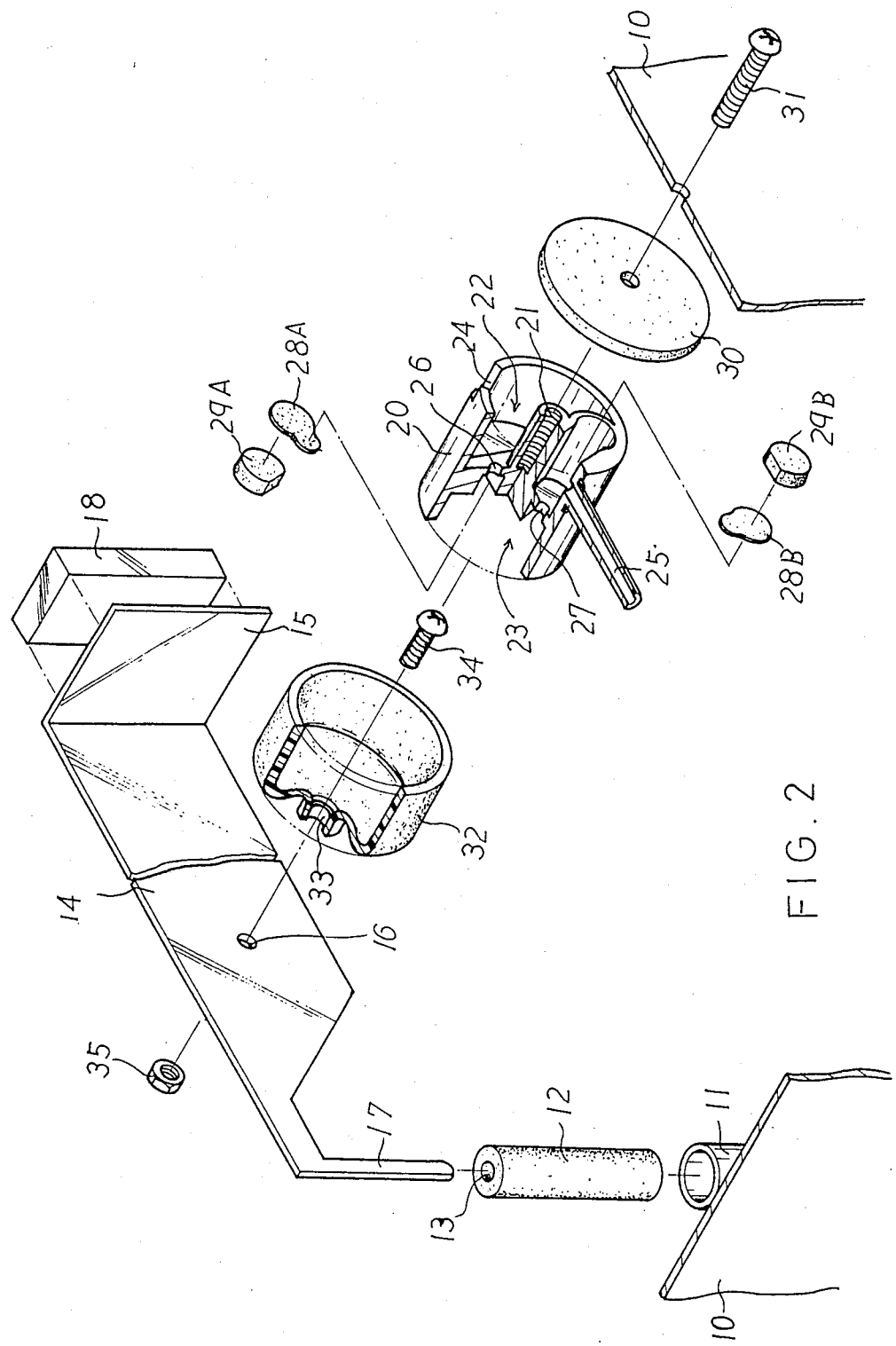
FIG. 2 is an exploded view showing an air-pumping drum device of a water and air pumping apparatus for a fish-raising pool according to the present invention.
Figure 3:
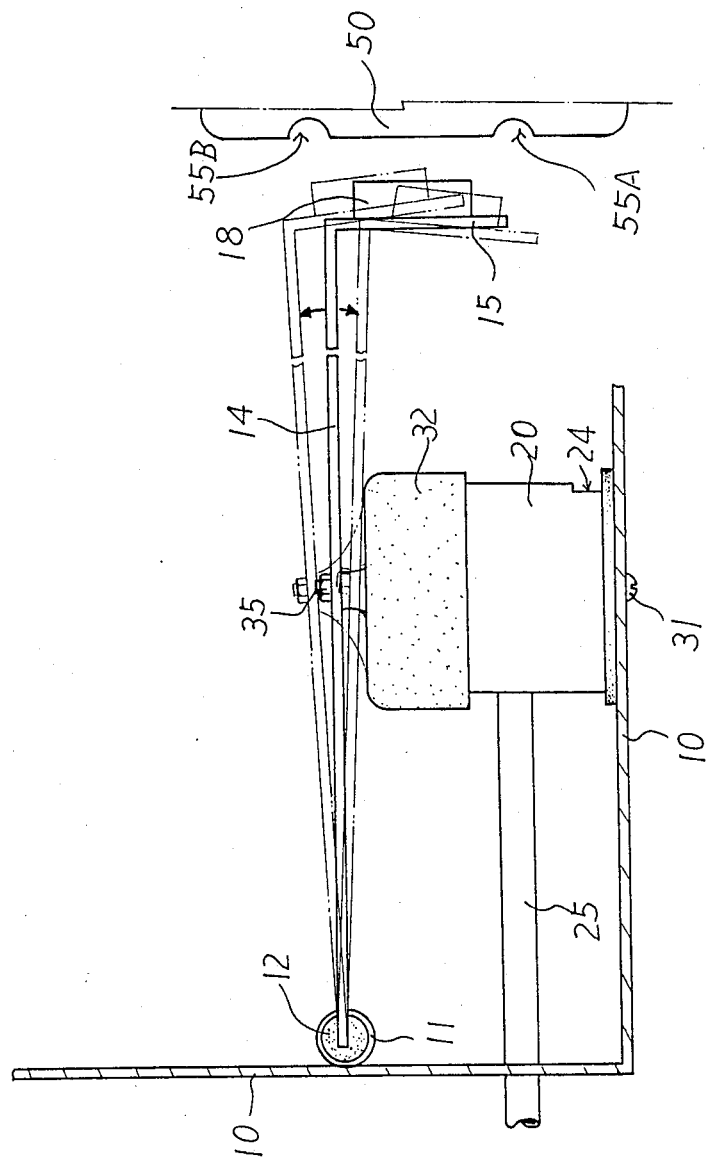
FIG. 3 is a schematic view showing a water and air pumping apparatus for a fish-raising pool according to the present invention in operation.

Referring now to FIGS. 1-3, there is shown a preferred embodiment of a water and air pumping apparatus for a fish-raising pool according to the present invention which includes a shaded-pool motor 50, a water-pumping mechanism as in the prior art (not shown) to be driven by a rotating shaft 53 of motor 50, an air-pumping drum device 40 having a collapsible compressing cap 23, a reciprocating arm 14 having an end 17 fixed on the housing 10 of motor 50 and an intermediate portion attached to compressing cap 32, and a magnet 18 secured on an bent end 15 of reciprocating arm 14 opposite to end 17. Motor 50 includes a laminated core 54, an exciting coil 51 wound on one side of core 54, a shading coil 56 mounted on another side of core 54 opposite to the side on which exciting coil 51 is around and a heat-dissipating fan 52 mounted on the top of the rotor. On the side surface of laminated core 54 adjacent to shading coil 56 but remote from exciting coil 51, there are provided two longitudinal grooves 55A, 55B symmetrical thereto and parallel to rotating shaft 53. Magnet 18 secured on bent end 15 is disposed as to face the area between grooves 55A, 55B on the side surface of core 54 where grooves 55A, 55B are provided. Magnet 18 and is capable of transversely reciprocating with respect to rotating shaft 53 so that when motor 50 drives the water-pumping mechanism, a strong variant magnetic field resulting from the provision of grooves 55A, 55B on the side surface of laminated core 54 will reciprocate magnet 18 and thus air-pumping drum device 40 will be activated. End 17 can be inserted in a hole 13 of a rubber sleeve 12 which, in turn, can be inserted in a tube 11 on housing 10.

Air-pumping drum device 40 includes a drum 20 having a central threaded hole 21 by which a bolt 31 secures drum 20 against a rubber washer 30 placed between drum 20 and housing 10, an air intake chamber 22 having an air inlet 24, an air exhaust chamber 23 communicating with chamber 22 through a hole 26, an air discharging tube 25 communicating with chamber 23 through a hole 27, and the above mentioned collapsible compressing cap 32 sleeved on an end of drum 20 and having a central hole 33 and a hole 16 on the intermediate portion of arm 14 through which a bolt 34 and a nut 35 are inserted so as to urge cap 32 against the intermediate portion of arm 14. A securing piece 29A and a rubber flap 28A unilaterally block hole 26. Likewise, a securing piece 29B and a rubber flap 28B unilaterally block hole 27.

When motor 50 drives the water-pumping mechanism, through the provision of grooves 55A, 55B on the suitable side surface of core 54, the primary winding will induce in the magnetic pole a time-variant magnetic flux. When the magnitude of the magnetic flux in the magnetic pole changes, shading coil 56 will induce a voltage and current to resist the changes of the magnetic flux, so that a net rotation of the magnetic pole in the direction from the unshaded portion of the shaded portion resulted by the unbalance between the two stator magnetic fields rotating in opposite directions will drive magnet 18 to reciprocate in the direction following that of the magnetic field resulted by the changes in the magnetic flux, since the provision of grooves 55A, 55B enlarges the effective distance and strength of the magnetic field on the side surface of core 54 where grooves 55A, 55B are provided. Thus, arm 14 securing thereon magnet 18 will reciprocate with end 17 acting as an axis of reciprocation. Therefore, arm 14 will put cap 32 in reciprocating compression and through the assistance of rubber flaps 28A, 28B, air is discharged from discharging tube 25.

I claim:

1. A water and air pumping apparatus for a fish-raising pool comprising a shaded-pole motor having an exciting coil, a shading coil and a laminated core, a centrifugal water-pumping mechanism driven by said motor, and an air pumping drum device having a compression cap, wherein the side surface of said laminated core adjacent to said shading coil but remote from said exciting coil has two longitudinal grooves symmetrical thereto and parallel to the rotating shaft of said motor, and a magnet connected to said compressing cap and disposed so as to face the area between said grooves on said side surface and to be capable of transversely reciprocating with respect to said rotating shaft so that when said motor drives said water-pumping mechanism, a strong variant magnetic field resulting from the provision of said grooves will reciprocate said magnet so that said air-pumping drum device is activated.

2. A water and air pumping apparatus for a fish-raising pool as claimed in claim 1, further comprising a reciprocating arm which has one end fixed on the housing of said motor, the other end securing said magnet and an intermediate portion attached to said compressing cap.

* * * * *